United States Patent
Shimizu et al.

(10) Patent No.: US 6,699,421 B2
(45) Date of Patent: Mar. 2, 2004

(54) METHOD FOR FORMING FOAMED POLYPROPYLENE RESIN SHEET AND FOAMED FORMED ARTICLE

(75) Inventors: Ken Shimizu, Chiba (JP); Yuuichi Yamanaka, Chiba (JP); Hiroyuki Maehara, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 36 days.

(21) Appl. No.: 10/140,067

(22) Filed: May 8, 2002

(65) Prior Publication Data

US 2002/0193458 A1 Dec. 19, 2002

(30) Foreign Application Priority Data

May 8, 2001 (JP) .................................... 2001-137381

(51) Int. Cl.⁷ .............................. C08J 9/36; B29C 67/20
(52) U.S. Cl. .................. 264/321; 521/79; 521/143; 521/144
(58) Field of Search ...................... 264/321; 521/79, 521/143, 144

(56) References Cited

U.S. PATENT DOCUMENTS 4,911,978 A * 3/1990 Ysubone et al.
5,116,881 A * 5/1992 Park et al.
5,741,459 A * 4/1998 Ando et al.

FOREIGN PATENT DOCUMENTS

| EP | 0 856 526 A1 | 8/1998 |
| EP | 0 864 589 A2 | 9/1998 |
| JP | 2-22031 | 1/1990 |
| JP | 2-252525 | 10/1990 |
| JP | 9-300446 | 11/1997 |
| JP | 2001-226514 | 8/2001 |
| WO | WO97/14725 | 4/1997 |

* cited by examiner

*Primary Examiner*—Morton Foelak
(74) *Attorney, Agent, or Firm*—Leydig, Voit & Mayer, Ltd.

(57) ABSTRACT

Provided are a method for forming a foamed polypropylene resin sheet in which draw down and waving are not caused in heating the foamed sheet and in which inferior appearance such as partial thickness and wrinkles is not produced on the product, and a foamed formed article having an excellent shape obtained from the same. The method comprises a heating step for heating and softening the foamed polypropylene resin sheet and a forming step for bringing the heated foamed polypropylene resin sheet into contact with a forming mold to form it into a prescribed shape, wherein the foamed polypropylene resin sheet has an expansion ratio of 1.1 to 6 times, an open cell rate of 70% or less and a sheet thickness of 0.5 to 5 mm; and the foamed polypropylene resin sheet described above is heated in the heating step in the state that it is supported on a tabular sheet support.

10 Claims, 1 Drawing Sheet

METHOD FOR FORMING FOAMED POLYPROPYLENE RESIN SHEET AND FOAMED FORMED ARTICLE

BACKGROUND OF THE INVENTION

1. Field of the Invention

The present invention relates to a method for forming a foamed polypropylene resin sheet and a foamed formed article obtained by the same. More specifically, it relates to a method for forming a foamed polypropylene resin sheet in which draw-down and waving are not caused in heating the foamed sheet and in which inferior appearance such as partial thickness and wrinkles is not observed on the product, and a foamed formed article having an excellent shape obtained by the above method.

2. Description of the Related Art

A foamed article formed from a foamed polypropylene resin sheet is light-weight and excellent in a stiffness, a heat insulating property and a heat resistance, so that it is used in diversified fields. Such a foamed formed article is obtained by forming a foamed resin sheet, which has been softened by heating, by a pressure forming method or a vacuum forming method using a forming mold. However, a polypropylene resin has a low melt tension, and therefore there have so far been the problems that so-called draw-down and waving are liable to be caused on the foamed sheet in heating and that the resulting product is liable to be inferior in appearance due to partial thickness and wrinkles. Such problems are noticeable when a foamed sheet is large-sized in an area or the heating temperature is elevated in order to shorten the forming cycle, thus preventing the improvement in productivity.

SUMMARY OF THE INVENTION

An object of the present invention is to provide a method for forming a foamed polypropylene resin sheet in which draw-down and waving are not caused in heating the foamed sheet and in which inferior appearance such as partial thickness and wrinkles is not produced on the product, and to provide a foamed formed article having an excellent shape obtained by the method, thereby solving the problems described above.

Intensive investigations repeated by the present inventors in order to solve the problems described above have resulted in finding that the object described above can be achieved by using a specific foamed polypropylene resin sheet and heating it while supported on a tabular sheet support, and thus they have come to complete the present invention based on this knowledge.

The present invention comprises the following structures.

(1) A method for forming a foamed polypropylene resin sheet comprising a heating step for heating and softening the foamed polypropylene resin sheet and a forming step for bringing the heated foamed polypropylene resin sheet into contact with a forming mold to form it into a prescribed shape, wherein the foamed polypropylene resin sheet has an expansion ratio of 1.1 to 6 times, an open cell rate of 70% or less and a sheet thickness of 0.5 to 5 mm; and the foamed polypropylene resin sheet is heated in the heating step in the state that it is supported on a tabular sheet support.

(2) The method for forming a foamed polypropylene resin sheet as described in the above item (1), wherein the sheet support is heated to 160–210° C. in the heating step.

(3) The method for forming a foamed polypropylene resin sheet as described in the above item (1) or (2), wherein a differential pressure of 0.05 to 1 MPa is applied between the upper face and the under face of the foamed polypropylene resin sheet in the forming step.

(4) The method for forming a foamed polypropylene resin sheet as described in any of the above items (1) to (3), wherein a polypropylene resin constituting the foamed polypropylene resin sheet satisfies the following equation:

$$\log MT > 4.24 \times \log [\eta] - 1.2$$

wherein MT represents a melt tension (unit: cN) at 230° C., and [η] represents an intrinsic viscosity (unit: dl/g) measured in a tetralin of 135° C.

(5) The method for forming a foamed polypropylene resin sheet as described in any of the above items (1) to (4), wherein the polypropylene resin constituting the foamed polypropylene resin sheet is an olefin polymer composition (A) shown below or a polypropylene resin composition comprising 10 to 99% by weight of the olefin polymer composition (A) and 90 to 1% by weight of a polypropylene resin (B): the olefin polymer composition (A) comprising:

(a) 0.01 to 5.0 parts by weight of a high molecular weight polyethylene having an ethylene polymer unit of 50% by weight or more, wherein the intrinsic viscosity $[\eta_E]$ measured in a tetralin of 135° C. falls in the range of 15 to 100 dl/g, and (b) 100 parts by weight of a propylene homopolymer or a propylene-olefin copolymer having a propylene polymer unit of 50% by weight or more, wherein the intrinsic viscosity $[\eta_P]$ measured in a tetralin of 135° C. falls in the range of 0.2 to 10 dl/g, and the polypropylene resin (B): a propylene homopolymer or a propylene/α-olefin copolymer comprising propylene as a main component.

(6) A foamed polypropylene resin formed article formed by the method as described in any of the above items (1) to (5).

BRIEF DESCRIPTION OF THE DRAWINGS

FIG. 1—1 is a schematic drawing of a heating part in a forming apparatus used in the present invention.

FIG. 1–2 is a schematic drawing of a forming part in the forming apparatus used in the present invention.

DETAILED DESCRIPTION OF THE PREFERRED EMBODIMENTS

Figures 1, 2:
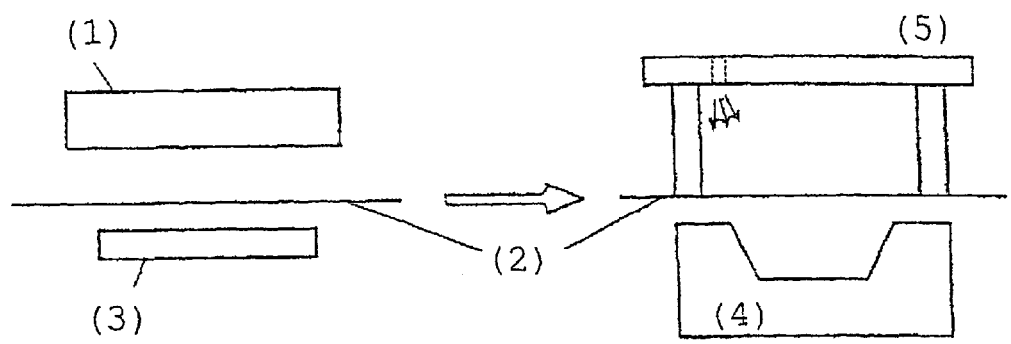

The embodiment of the present invention shall be explained below.

The method for forming a foamed polypropylene resin sheet of the present invention comprises a heating step for heating and softening the foamed polypropylene resin sheet and a forming step for bringing the heated foamed polypropylene resin sheet into contact with a forming mold to form it into a prescribed shape, wherein the foamed polypropylene resin sheet is heated in the heating step in the state that it is supported on a tabular sheet support.

The foamed polypropylene resin sheet used in the present invention is a foamed polypropylene resin sheet having an expansion ratio of 1.1 to 6 times, an open cell percentage of 70% or less and a thickness of 0.5 to 5 mm.

If the expansion ratio is less than 1.1 time, a light-weight property and a heat insulating property of the product are unsatisfactory. If the expansion ratio exceeds 6 times or the open cell rate exceeds 70%, a partial thickness and wrinkles are produced on the product and the strength against bending and compressing is reduced.

If the sheet has a thickness of less than 0.5 mm, the product is short of stiffness. On the other hand, if the thickness exceeds 5 mm, time required for heating is extended to deteriorate the productivity.

The foamed polypropylene resin sheet used in the present invention may have the same multilayer structure as that of a foamed polypropylene resin sheet usually used for forming.

The method of the present invention shall be explained with reference to FIG. 1 showing one example of a forming apparatus equipped with a tabular sheet support in a heating part where the heating step is carried out.

The foamed polypropylene resin sheet delivered from a raw material roll (not illustrated) was intermittently fed to the heating part while nipped between a pair of vertically disposed cramps (not illustrated) disposed at both ends of a transferring line. A heater (1) for heating the foamed polypropylene resin sheet (2) and the tabular sheet support (3) are provided in the heating part. The size of the sheet support may be the same as or larger by about 20% than a developed area (planar projected area) of the resulting foamed polypropylene resin formed article. Aluminum, stainless steel or ceramics can be used for the material thereof.

This sheet support (3) is directly heated by heat radiated from the heater (1) when the foamed polypropylene resin sheet (2) is not put thereon, whereas it is indirectly heated via the foamed polypropylene resin sheet when the foamed polypropylene resin sheet is put thereon, and it is a heating source for the foamed polypropylene resin sheet. A heating element may be provided inside the sheet support to make itself a heating source. When the sheet support has a heating element inside thereof, this can be disposed on the upper or under face side or both of the foamed polypropylene resin sheet to omit the heaters provided on the upper side and/or the under side. Further, an air hole may be disposed on this support to apply vacuum or compressed air to the foamed polypropylene resin sheet. In this case, the sheet can be formed in a fixed state without transferring it from the heating part to the forming part where the forming step is carried out.

The foamed polypropylene resin sheet is heated while supported on the sheet support until the prescribed temperature is reached. The sheet support is provided so as to prevent the foamed polypropylene resin sheet from drawdown, and therefore the sheet does not have to be brought into close contact with the sheet support and may be held in such a state that a gap corresponding to about 200% of the sheet thickness is provided between both. When the sheet support is brought into close contact with the foamed sheet, the sheet can evenly be heated. If the gap is provided, the sheet can more moderately be heated by the heater or the sheet support, which is effective for preventing the foamed sheet from waving and breakage of the foams.

The heating temperature is varied depending on a thickness and an expansion ratio of the foamed polypropylene resin sheet and is preferably from about 160 to 210° C. from the viewpoints of the formability and the transferability onto the forming part.

Then, the heated foamed polypropylene resin sheet is transferred to the forming part and brought into contact with a forming mold, whereby it is formed. Its contact with the forming mold may be carried out by any means such as a vacuum forming method in which a decompression is applied from a lower part of the forming mold (deaerating the air between the forming mold and the sheet), a pressure forming method in which a compression is applied from an upper part of the forming mold (blowing the pressurized air into the sheet while it is interposed between the forming mold and a compression box and the forming mold is closed) as well as a combination of deaeration with compression (in the present invention, they are called "differential pressure forming method").

The air pressure applied to the heated foamed polypropylene resin sheet is preferably 0.05 to 1 MPa in terms of a differential pressure between the upper face side and the under face side of the sheet from the viewpoints of the formability and prevention of the formed article from breakage.

A temperature of the forming mold is varied depending on a shape and a thickness of the formed article, and usually it is suitably selected in the range of 20 to 90° C.

The polypropylene resin constituting the foamed polypropylene resin sheet used in the present invention is preferably a polypropylene resin satisfying the following equation:

$$\log MT > 4.24 \times \log [\eta] - 1.2$$

wherein MT represents a melt tension (unit: cN) at 230° C., and $[\eta]$ represents an intrinsic viscosity (unit: dl/g) measured in a tetralin of 135° C.

If the melt tension and the intrinsic viscosity fall in the range shown by the equation described above, the foamed sheet having a lot of independent cells and a small open cell rate is liable to be obtained.

In the present invention, the polypropylene resin constituting the foamed polypropylene resin sheet is preferably an olefin polymer composition (A) having the following characteristics: the olefin polymer composition (A) comprising:

(a) 0.01 to 5.0 parts by weight of an ethylene homopolymer or an ethylene-olefin copolymer having an ethylene polymer unit of 50% by weight or more, wherein the intrinsic viscosity $[\eta_E]$ measured in a tetralin of 135° C. falls in the range of 15 to 100 dl/g, and (b) 100 parts by weight of a propylene homopolymer or a propylene-olefin copolymer having a propylene polymer unit of 50% by weight or more, wherein the intrinsic viscosity $[\eta_P]$ measured in a tetralin of 135° C. falls in the range of 0.2 to 10 dl/g.

Such olefin polymer composition (A) can be prepared by a method disclosed in International Publication WO97/14725, that is, a two-stage polymerization method in which a catalyst for polymerizing olefin prepared by combining a carrying type titanium-containing solid catalyst component with an organic aluminum compound is used to polymerize ethylene to obtain a prescribed amount of high molecular weight polyethylene having an intrinsic viscosity $[\eta_E]$ falling in the range of 15 to 100 dl/g and subsequently polymerize propylene to obtain a prescribed amount of polypropylene having an intrinsic viscosity $[\eta_P]$ falling in the range of 0.2 to 10 dl/g. The olefin polymer composition (A) thus obtained satisfies the equation described above in terms of the relation of a melt tension to an intrinsic viscosity.

The olefin polymer composition (A) is preferably used alone as a polypropylene resin and can be used as well in the form of a polypropylene resin composition blended with other polypropylene resins as long as a melt tension and an intrinsic viscosity of the polypropylene resin finally obtained satisfies the relation shown by the equation described above. When used in a mixture with the other polypropylene resin, the polypropylene resin is preferably used in the form of a polypropylene resin composition comprising 10 to 99% by weight of the olefin polymer composition (A) and 90 to 1% by weight of the other polypropylene resin (B). In this case, the polypropylene resin (B) may be either a propylene homopolymer or a propylene/α-olefin copolymer comprising propylene as a main component.

A method by which the olefin polymer composition (A) and the polypropylene resin (B) each described above are blended to prepare a polypropylene resin composition shall not specifically be restricted, and available one is a mixer usually used for blending polypropylene, such as a Henschel mixer (brand name), a super mixer and a tumbler mixer. The mixture thus obtained may be molten, kneaded and pelletized by means of a roll mill or an extruder. In this case, various additives such as stabilizers, weather-resistant agents, antistatic agents and colorants which are usually added to polypropylene and the like can be added as well.

In the present invention, the polypropylene resin has preferably a melting point of 165° C. or lower, because a production step of a foamed sheet and a step of secondary foaming by heating in forming can be carried out at a relatively low temperature at which the melt tension of the polypropylene resin is not reduced, and therefore a foamed product having fine appearance can stably be obtained in a high yield.

The foamed polypropylene resin sheet used in the present invention is produced by further adding a foaming agent to the polypropylene resin composition obtained by adding various additives such as stabilizers, weather-resistant agents, antistatic agents and colorants which are usually added, if necessary, to polypropylene and the like to the polypropylene resin described above.

The polypropylene resin composition used in the present invention can usually be blended with 80% by weight or less, preferably 5 to 30% by weight, of a filler based on the composition as long as the characteristics of the foamed sheet are not damaged. Illustrative examples of the filler are clay, talc, silica, calcium carbonate, alumina, zeolite, barium sulfate, titanium oxide, wood flour, paper powder and organic fibers of PET and the like.

Further, the polypropylene resin composition used in the present invention can be blended, as long as the characteristics of the foamed sheet are not damaged, with at least one of various thermoplastic resins other than a polypropylene resin, including ethylene base resins such as high density polyethylene, medium density polyethylene, low density polyethylene, linear low density polyethylene, linear ultra low density polyethylene and ethylene-vinyl acetate copolymers; polyolefin base rubbers such as syndiotactic polypropylene resins, butene base resins, cyclic olefin base resins, petroleum resins, styrene base resins, acryl base resins, fluororesins, ethylene-propylene copolymer rubbers, ethylene-butene copolymer rubbers, ethylene-hexene copolymer rubbers and ethylene-octene copolymer rubbers; polyamide resins and polyester resins.

A blending proportion thereof is preferably maximum 50 parts by weight per 100 parts by weight of the polypropylene resin composition.

The polypropylene resin composition described above is obtained by suitably weighing the polypropylene resin and the additives described above and stirring, mixing and compounding them by means of a mixer usually used for blending polypropylene, such as a Henschel mixer (brand name), a super mixer and a tumbler mixer. The polypropylene resin composition thus obtained may be molten, kneaded and pelletized by means of a roll mill or an extruder.

The foamed polypropylene resin sheet used in the present invention can be produced by a publicly known extrusion-foaming method in which a foaming agent is added to the polypropylene resin composition described above and in which the mixture is molten, kneaded and then extruded through a T-die or a circular die under low pressure. The foaming agent is added preferably in a proportion of 0.1 to 10 parts by weight per 100 parts by weight of the polypropylene resin composition.

Any of publicly known volatile type foaming agents and decomposition type foaming agents can be used as the foaming agent. The examples of the volatile type foaming agents can include aliphatic hydrocarbons such as propane and butane; alicyclic hydrocarbons such as cyclobutane; halogenated hydrocarbons such as chlorodifluoromethane, trifluoromethane, dichlorodifluoromethane and dichlorotrifluoroethane; inorganic gases such as carbon dioxide, nitrogen gas and air; and water. The examples of the decomposition type foaming agents can include N,N'-dinitrosopentamethylenetetramine, azodicarbonamide, p,p'-oxybis(benzenesulfonylhydrazide) and citric acid. Further, foaming nuclear agents such as sodium hydrogen carbonate and citric acid can be used as well.

EXAMPLES

The present invention shall more specifically be explained with reference to examples and comparative examples, but the present invention shall not be restricted to these examples.

Measuring methods and evaluation methods of physical properties used in the examples and the comparative examples are shown below.

1) Melt Tension

A melt tension tester model 2 (manufactured by Toyo Seiki Seisaku-Sho, Ltd.) was used to determine a tension (unit: cN) observed when a strand obtained by extruding the resin molten by heating at 230° C. from an orifice having a diameter of 2.095 mm and a length of 40 mm at a rate of 20 mm/min is drawn at a rate of 3.14 m/min.

2) Melt Flow Rate

Measured based on the condition 14 (test temperature: 230° C., test load: 21.18N) in Table 1 of JIS K 7210 "flow test method of thermoplastic plastics" (unit: g/10 min).

3) Expansion Ratio

Calculated from a density (d) of a resin before foaming, a volume (V) of a foamed article and a weight (W) of the foamed article according to the following equation:

$$\text{expansion ratio} = (d \times V)/W$$

4) Open Cell Ratio

Measured by means of an air pycnometer (manufactured by Tokyo Science Co., Ltd.) according to ASTM D2856 (unit: %).

5) Evaluation of Formed Article

A vacuum pressure forming apparatus equipped with an aluminum plate-made film support of (150×200×3.5 mm) in a heating part was used to heat a sample foamed sheet in a heating part set at a heater temperature of 300° C. for prescribed time, and then the sheet was transferred to a forming part and formed into a rectangular container having a height of 150 mm, a width of 200 mm and a depth of 25 mm for 20 seconds by a pressure forming method. The presence or absence of wrinkles produced on the product and an extent thereof were observed. In this respect, a temperature on the surface of the sheet support was measured in advance immediately before heating the foamed sheet without putting the foamed sheet thereon. In the comparative examples, the sheet support was taken away, and the sheet was heated for prescribed time and then formed.

Shown in Table 1 are the evaluation results (presence of the sheet support, heating time, a surface temperature of the sheet support, air pressure in compression forming and appearance of the formed article).

The blended components used in the examples and the comparative examples are shown below.

PP-1: propylene homopolymer having an intrinsic viscosity [η] of 2.7 dl/g.
PP-2: olefin polymer composition (A) having an intrinsic viscosity [η] of 2.7 dl/g and comprising (a) and (b) described below, which was prepared by the two-stage polymerization method disclosed in International Publication WO97/14725:
  (a) 0.4 part by weight of a high molecular weight ethylene homopolymer having an intrinsic viscosity $[\eta_E]$ of 31 dl/g which was measured in a tetralin of 135° C., and
  (b) 100 parts by weight of a propylene homopolymer having an intrinsic viscosity $[\eta_P]$ of 2.6 dl/g which was measured in a tetralin of 135° C.
PP-3: propylene homopolymer having an intrinsic viscosity [η] of 2.0 dl/g.
PP-4: olefin polymer composition (A) having an intrinsic viscosity [η] of 2.0 dl/g and comprising (a) and (b) described below, which was prepared by the two-stage polymerization method disclosed in International Publication WO97/14725:

Then, a pelletizer having a screw diameter of 40 mm which was set at a cylinder temperature of 230° C. was used to obtain pelletized polypropylene resin compositions. Each 100 parts by weight of the resin compositions thus obtained was blended with one part by weight of citric acid which was a decomposition type foaming agent and extruded at 230 to 175° C. by means of an extruder equipped with a T-die to obtain foamed sheets having a thickness of 1.0 mm. Shown in Table 1 are an expansion ratio and an open cell rate of these foamed sheets and the evaluation of the resulting formed articles.

Examples 3 and 4 and Comparative Example 2

Added respectively to each 100 parts by weight of the polypropylene resins (PP-3 and PP-4) having melt tensions and melt flow rates described in Table 1 were 0.2 part by weight of tetrakis[methylene-3-(3',5'-di-t-butyl-4'-hydroxypheyl)propionate] methane and 0.1 part by weight of calcium stearate, and the mixture was stirred and blended for 3 minutes by means of the Henschel mixer (brand name). Then, the pelletizer having a screw diameter of 40 mm which was set at a cylinder temperature of 230° C. was used to obtain pelletized polypropylene resin compositions. Each 100 parts by weight of the resin compositions thus obtained was blended with 0.4 part by weight of citric acid as a foaming nuclear agent using liquefied butane as a volatile type foaming agent and extruded at 230 to 175° C. by means of an extruder equipped with a circular die to obtain foamed sheets having a thickness of 1.5 mm. Shown in Table 1 are an expansion ratio and an open cell rate of the these foamed sheets and the evaluation of the resulting formed articles

TABLE 1

|  | Example | | | | Comparative Example | |
| --- | --- | --- | --- | --- | --- | --- |
|  | 1 | 2 | 3 | 4 | 1 | 2 |
| PP used | PP-1 | PP-2 | PP-3 | PP-4 | PP-1 | PP-3 |
| [η] (dl/g) | 2.7 | 2.7 | 2.0 | 2.0 | 2.7 | 2.0 |
| Melt tension (cN) | 4.0 | 10 | 1.0 | 5.0 | 4.0 | 1.0 |
| Sheet thickness (mm) | 1.0 | 1.0 | 0.8 | 1.5 | 1.0 | 0.8 |
| Expansion ratio (time) | 1.2 | 1.8 | 2.0 | 3.5 | 1.2 | 2.0 |
| Open cell rate (%) | 36 | 25 | 40 | 8 | 36 | 40 |
| Presence of supporter | Present | Present | Present | Present | None | None |
| Surface temperature of supporter | 200° C. | 200° C. | 180° C. | 180° C. | — | — |
| Compression pressure (MPa) | 0.7 | 0.7 | 0.45 | 0.45 | 0.7 | 0.45 |
| Heating time (sec) | 24 | 20 | 16 | 16 | 24 | 16 |
| Appearance of formed article | Good | Good | Good | Good | Wrinkled | Wrinkled |

(a) 0.25 part by weight of a high molecular weight ethylene homopolymer having an intrinsic viscosity $[\eta_E]$ of 31 dl/g which was measured in a tetralin of 135° C., and
  (b) 100 parts by weight of a propylene homopolymer having an intrinsic viscosity $[\eta_P]$ of 2.0 dl/g which was measured in a tetralin of 135° C.

Examples 1 and 2 and Comparative Example 1

Added respectively to each 100 parts by weight of the polypropylene resins (PP-1 and PP-2) having melt tensions and intrinsic viscosities described in Table 1 were 0.2 part by weight of tetrakis[methylene-3-(3',5'-di-t-butyl-4'-hydroxypheyl) propionate] methane and 0.1 part by weight of calcium stearate, and the mixture was stirred and blended for 3 minutes by means of a Henschel mixer (brand name).

Effects of the Invention

As apparent from the data shown in Table 1, use of the method of the present invention makes it possible to stably produce a good, foamed formed article having no inferior appearance such as partial thickness and wrinkles.

What is claimed is:

1. A method for forming a foamed polypropylene resin sheet comprising a heating step for heating and softening the foamed polypropylene resin sheet and a forming step for bringing the heated foamed polypropylene resin sheet into contact with a forming mold to form it into a prescribed shape, wherein the foamed polypropylene resin sheet has an expansion ratio of 1.1 to 6 times, an open cell rate of 70% or less and a sheet thickness of 0.5 to 5 mm; and the foamed polypropylene resin sheet is heated in the heating step in the state that it is supported on a tabular sheet support.

2. The method for forming a foamed polypropylene resin sheet as described in claim 1, wherein the sheet support is heated to 160–210° C. in the heating step.

3. The method for forming a foamed polypropylene resin sheet as described in claim 1, wherein a differential pressure of 0.05 to 1 MPa is applied between the upper face and the under face of the foamed polypropylene resin sheet in the forming step.

4. The method for forming a foamed polypropylene resin sheet as described in claim 1, wherein a polypropylene resin constituting the foamed polypropylene resin sheet satisfies the following equation:

$$\log MT > 4.24 \times \log [\eta] - 1.2$$

wherein MT represents a melt tension (unit: cN) at 230° C., and $[\eta]$ represents an intrinsic viscosity (unit: dl/g) measured in a tetralin of 135° C.

5. The method for forming a foamed polypropylene resin sheet as described in claim 4, wherein the polypropylene resin constituting the foamed polypropylene resin sheet is an olefin polymer composition (A) shown below or a polypropylene resin composition comprising 10 to 99% by weight of the olefin polymer composition (A) and 90 to 1% by weight of a polypropylene resin (B): the olefin polymer composition (A) comprising:

(a) 0.01 to 5.0 parts by weight of a high molecular weight polyethylene having an ethylene polymer unit of 50% by weight or more, wherein the intrinsic viscosity $[\eta_E]$ measured in a tetralin of 135° C. falls in the range of 15 to 100 dl/g, and (b) 100 parts by weight of a propylene homopolymer or a propylene-olefin copolymer having a propylene polymer unit of 50% by weight or more, wherein the intrinsic viscosity $[\eta_P]$ measured in a tetralin of 135° C. falls in the range of 0.2 to 10 dl/g, and the polypropylene resin (B): a propylene homopolymer or a propylene/α-olefin copolymer comprising propylene as a main component.

6. A foamed polypropylene resin formed article formed by the method as described in claim 1.

7. A foamed polypropylene resin formed article formed by the forming method as described in claim 2.

8. A foamed polypropylene resin formed article formed by the forming method as described in claim 3.

9. A foamed polypropylene resin formed article formed by the forming method as described in claim 4.

10. A foamed polypropylene resin formed article formed by the forming method as described in claim 5.

* * * * *